United States Patent
Seok (10) Patent No.: US 10,719,215 B2
(45) Date of Patent: Jul. 21, 2020

(54) METHOD AND APPARATUS FOR CONTROLLING VEHICLE USING DIAL KNOB

(71) Applicants: HYUNDAI MOTOR COMPANY, Seoul (KR); KIA MOTORS CORPORATION, Seoul (KR)

(72) Inventor: Park Jae Seok, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/212,552

(22) Filed: Dec. 6, 2018

(65) Prior Publication Data

US 2020/0156474 A1 May 21, 2020

(30) Foreign Application Priority Data

Nov. 20, 2018 (KR) .................. 10-2018-0143630

(51) Int. Cl.
*G06F 3/0484* (2013.01)
*B60K 37/06* (2006.01)
(Continued)

(52) U.S. Cl.
CPC .......... *G06F 3/04847* (2013.01); *B60K 37/06* (2013.01); *G01C 21/3664* (2013.01);
(Continued)

(58) Field of Classification Search
CPC ........ G06F 3/02; G06F 3/0202; G06F 3/0312; G06F 3/03543; G06F 3/03548;
(Continued)

(56) References Cited

U.S. PATENT DOCUMENTS

2004/0141007 A1* 7/2004 Amari .................. B60K 37/06
715/771
2009/0079712 A1* 3/2009 Levin .................... G05G 9/047
345/184
(Continued)

FOREIGN PATENT DOCUMENTS

JP 2015-007841 A 1/2015
KR 10-2003-0066871 A 8/2003
(Continued)

*Primary Examiner* — Premal R Patel
(74) *Attorney, Agent, or Firm* — Morgan, Lewis & Bockius LLP (57) ABSTRACT

A method of controlling a vehicle using a dial knob includes steps of generating a first numerical value obtained by numeralizing a degree of rotation of the dial knob in a first direction and storing operation data reflecting the first numerical value, controlling the vehicle using control data, if the stored operation data corresponds to the control data, generating a second numerical value obtained by numeralizing a degree of rotation of the dial knob in a second direction opposite to the first direction and storing operation data reflecting the second numerical value, if the operation data does not correspond to the control data, and controlling the vehicle using the control data if the stored operation data corresponds to the control data, and returning to the step of generating the first numerical value if the operation data does not correspond to the control data.

20 Claims, 5 Drawing Sheets

(51) Int. Cl.
*G01C 21/36* (2006.01)
*G06F 3/03* (2006.01)
*G06F 3/02* (2006.01)

(52) U.S. Cl.
CPC .............. *G06F 3/02* (2013.01); *G06F 3/0312* (2013.01); *B60K 2370/11* (2019.05); *B60K 2370/126* (2019.05)

(58) Field of Classification Search
CPC ... G06F 3/0362; G06F 3/04847; B60K 37/06; B60K 2370/11; B60K 2370/126; G01C 21/3664
See application file for complete search history.

(56) References Cited

U.S. PATENT DOCUMENTS

| | | | |
|---|---|---|---|
| 2011/0312372 A1* | 12/2011 | Miura | G06F 1/169 455/550.1 |
| 2016/0011680 A1* | 1/2016 | Hisatsugu | G06F 3/0485 345/159 |
| 2016/0085321 A1* | 3/2016 | Jung | G06F 3/0362 345/184 |
| 2016/0216702 A1* | 7/2016 | Jefferies | G05B 11/01 |
| 2016/0259431 A1* | 9/2016 | Hamamoto | G06F 3/0362 |
| 2017/0045864 A1* | 2/2017 | Fadell | G05D 23/1904 |
| 2017/0162347 A1* | 6/2017 | Harazawa | H01H 9/56 |
| 2018/0136676 A1* | 5/2018 | Sloo | G05D 23/1902 |
| 2018/0204493 A1* | 7/2018 | Sakamaki | B60K 37/00 |

FOREIGN PATENT DOCUMENTS

| | | |
|---|---|---|
| KR | 10-2006-0039202 A | 5/2006 |
| KR | 10-2014-0084461 A | 7/2014 |
| KR | 10-2016-0037688 A | 4/2016 |

* cited by examiner

| A | B | C | D | E | F | G | H | I | J | K | L | M | N | O | P | Q | R | S | T | U | V | W | X | Y | Z | END |
|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | . |

METHOD AND APPARATUS FOR CONTROLLING VEHICLE USING DIAL KNOB

CROSS REFERENCE TO RELATED APPLICATION

This application is based on and claims the benefit of priority to Korean Patent Application No. 10-2018-0143630 filed on Nov. 20, 2018 in the Korean Intellectual Property Office, which is hereby incorporated in its entirety by reference as if fully set forth herein.

TECHNICAL FIELD

Embodiments relate to a method and apparatus for controlling a vehicle using a dial knob.

BACKGROUND

In today's diverse and complex society, drivers have increasingly spent more time in a vehicle during the day and thus want to conduct business or to obtain necessary information in the vehicle.

In addition, the drivers want to receive a vehicle navigation service such as traffic information and route guidance to a destination or various multimedia services such as AV functions such as listening to music using a CD, watching video and watching TV during driving.

In order to satisfy various demands of such drivers, technological development of information terminals, AV systems and navigation systems for vehicles is actively being carried out.

However, in order to perform such various functions in the vehicle, a driver or a user must find and operate a selection switch (or a button) provided to perform a corresponding function. In addition, upon making a call or selecting the frequency of a broadcast station in the vehicle, the driver may not be able to look ahead and thus may be exposed to accident risk.

SUMMARY

Accordingly, embodiments are directed to a method and apparatus for controlling a vehicle using a dial knob that substantially obviate one or more problems due to limitations and disadvantages of the related art.

An object of embodiments is to provide a method and apparatus for controlling a vehicle using a dial knob, which is capable of more conveniently performing the functions of a vehicle.

In one embodiment, a method of controlling a vehicle using a dial knob includes (a1) generating a first numerical value obtained by numeralizing a degree of rotation of the dial knob in a first direction and storing operation data reflecting the first numerical value, (b1) controlling the vehicle using control data, if the stored operation data corresponds to the control data, (c1) generating a second numerical value obtained by numeralizing a degree of rotation of the dial knob in a second direction opposite to the first direction and storing operation data reflecting the second numerical value, if the operation data does not correspond to the control data, and (d1) controlling the vehicle using the control data if the stored operation data corresponds to the control data, and returning to the step (a1) if the operation data does not correspond to the control data.

For example, the step (a1) may include checking whether the dial knob has been rotated in the first direction, generating the first numerical value if the dial knob has been rotated in the first direction, storing the operation data reflecting the first numerical value if the dial knob has been rotated in the first direction before a first predetermined period elapses after the dial knob has been rotated in the second direction or after the second numerical value has been stored, and deleting the stored operation data without storing the first numerical value if the dial knob has been rotated in the first direction as the first predetermined period has elapsed after the dial knob has been rotated in the second direction or after the second numerical value has been stored.

For example, the method may further include checking whether the dial knob has been pressed if the dial knob has not been rotated in the first direction, generating a first symbol if the dial knob has been pressed, storing the operation data reflecting the first symbol if the dial knob has been pressed before a first predetermined time elapses after the dial knob has been rotated in the second direction or after the second numerical value has been stored, and deleting the stored operation data without storing the first symbol if the dial knob has been pressed as the first predetermined period has elapsed after the dial knob has been rotated in the second direction or after the second numerical value has been stored.

For example, the step (c1) may include checking whether the dial knob has been rotated in the second direction, generating the second numerical value if the dial knob has been rotated in the second direction, storing the operation data reflecting the second numerical value if the dial knob has been rotated in the second direction before a second predetermined period elapses after the dial knob has been rotated in the first direction or after the first numerical value has been stored, and deleting the stored operation data without storing the second numerical value if the dial knob has been rotated in the second direction as the second predetermined period has elapsed after the dial knob has been rotated in the first direction or after the first numerical value has been stored.

For example, the method may further include checking whether the dial knob has been pressed if the dial knob has not been rotated in the second direction, generating a second symbol if the dial knob has been pressed, storing the operation data reflecting the second symbol if the dial knob has been pressed before a second predetermined time elapses after the dial knob has been rotated in the first direction or after the dial knob has been pressed, and deleting the stored operation data without storing the second symbol if the dial knob has been pressed as the second predetermined period has elapsed after the dial knob has been rotated in the first direction or after the dial knob has been pressed.

The first predetermined period and the second predetermined period may be equal to each other.

In another embodiment, a method of controlling a vehicle using a dial knob may include (a2) checking whether the dial knob has been rotated in a first direction, (b2) generating a first numerical value obtained by numeralizing a degree of rotation of the dial knob, if the dial knob has been rotated in the first direction, (c2) controlling the vehicle using control data, if a combination of the first numerical value and pre-stored operation data corresponds to the control data, (d2) checking whether the dial knob has been rotated in a second direction opposite to the first direction, if the combination of the first numerical value and the pre-stored operation data does not correspond to the control data, (e) storing the operation data reflecting the first numerical value and generating a second numerical value obtained by numeralizing a degree of rotation of the dial knob in the second direction, if the dial knob has been rotated in the second direction, and (f) controlling the vehicle using the control data, if a combination of the second numerical value and the pre-stored operation data corresponds to the control data. If the combination of the second numerical value and the pre-stored operation data does not correspond to the control data, the method may return to the step (a2) to store the operation data reflecting the second numerical value when the dial knob is rotated in the first direction.

For example, the method may further include checking whether the dial knob has been pressed, if the dial knob has not been rotated in the first direction, generating a first symbol and storing the operation data reflecting a pre-generated second numerical value and a second symbol, if the dial knob has been pressed, controlling the vehicle using the control data, if the combination of the first symbol and the pre-stored operation data corresponds to the control data, and returning to the determining of whether the dial knob has been rotated in the second direction, if the combination of the first symbol and the pre-stored operation data does not correspond to the control data, checking whether the dial knob has been pressed, if the dial knob has not been rotated in the second direction, generating a second symbol and storing the operation data reflecting a pre-generated first numerical value or the first symbol, if the dial knob has been pressed, and controlling the vehicle using the control data, if a combination of the second symbol and pre-stored operation data corresponds to the control data, and returning to the step (a2) to store the operation data reflecting the second numerical value or the second symbol when the dial knob is rotated in the first direction, if the combination of the second symbol and the pre-stored operation data does not correspond to the control data.

For example, the method may further include setting a relationship between the operation data and the control data.

For example, the first direction may be any one of a clockwise direction and a counterclockwise direction, and the second direction may be the other of the clockwise direction and the counterclockwise direction.

For example, the control data may perform one of multimedia functions of the vehicle.

For example, the first and second numerical values may be predetermined according to the degree of rotation of the dial knob in the first or second direction.

In another embodiment, an apparatus for controlling a vehicle includes a dial knob configured to be rotated in a first or second direction, or pressed, the first and second direction being different from each other, a processor configured to generate a first or second numerical value when the dial knob is rotated in the first or second direction and to generate a first or second symbol when the dial knob is pressed, a memory configured to store operation data reflecting at least one of the first numerical value, the second numerical value, the first symbol or the second symbol. The processor is further configured to compare the operation data with control data The apparatus further includes a controller communicatively connected to the dial knob, the processor, and the memory, and configured to store at least one of the first numerical value, the second numerical value, the first symbol or the second symbol generated by the processor, to output the control data for controlling the vehicle in response to a result of comparison in the processor, and to read and output the operation data from the memory to the processor.

For example, the processor may be further configured to check whether a first predetermined period has elapsed after the dial knob has been rotated in the second direction or after the second numerical value or the second symbol has been stored and to check whether a second predetermined period has elapsed after the dial knob has been rotated in the first direction or after the first numerical value or the first symbol has been stored, and the controller may reset the memory and store the operation data reflecting at least one of the first numerical value, the second numerical value, the first symbol or the second symbol in the memory, in response to a result checked by the processor.

For example, the controller may check whether operation of the dial knob has been changed and store at least one of the first numerical value, the second numerical value, the first symbol or the second symbol in the memory in response to a result of checking.

For example, the dial knob may include a dual-purpose knob configured to be operated using a first operation method to perform an inherent function thereof and to be operated using a second operation method different from the first operation method to perform a function of the dial knob.

BRIEF DESCRIPTION OF THE DRAWINGS

Arrangements and embodiments will be described in detail with reference to the following drawings in which like reference numerals refer to like elements and wherein.

DETAILED DESCRIPTION

The present disclosure will now be described more fully hereinafter with reference to the accompanying drawings, in which various embodiments are shown. The examples, however, may be embodied in many different forms and should not be construed as being limited to the embodiments set forth herein. Rather, these embodiments are provided so that this disclosure will be more thorough and complete, and will more fully convey the scope of the disclosure to those skilled in the art.

In the following description of the embodiments, it will be understood that, when each element is referred to as being formed "on" or "under" the other element, it can be directly "on" or "under" the other element or be indirectly formed with one or more intervening elements therebetween. In addition, it will also be understood that "on" or "under" the element may mean an upward direction and a downward direction of the element.

In addition, as used herein, relational terms, such as "first", "second", "on"/"upper"/"above", "under"/"lower"/

"below," and the like, are used solely to distinguish one entity or element from another entity or element without necessarily requiring or implying any physical or logical relationship or order between such entities or elements.

Hereinafter, a method of controlling a vehicle using a dial knob according to an embodiment will be described with reference to the accompanying drawings.

Figure 1:
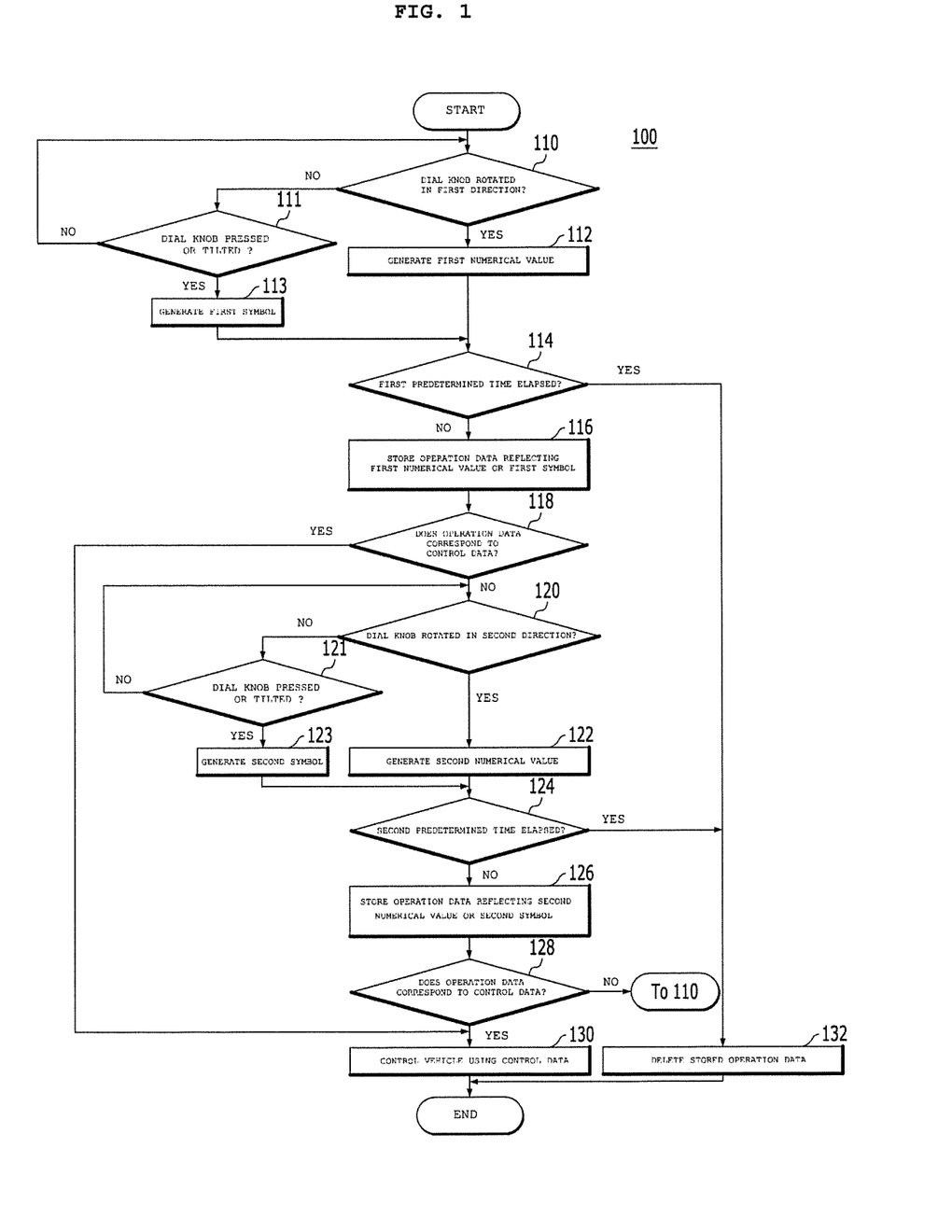
FIG. 1 is a flowchart illustrating a method of controlling a vehicle using a dial knob according to an embodiment.

FIG. 1 is a flowchart illustrating a method 100 of controlling a vehicle using a dial knob according to an embodiment.

The vehicle control method 100 according to the embodiment may include steps 110, 112, 116, 118, 120, 122, 126, 128 and 130. The vehicle control method 100 may further include steps 114, 124 and 132. In addition, the vehicle control method 100 may further include steps 111, 113, 121 and 123.

First, the vehicle control method 100 according to the embodiment including steps 110, 112, 114, 124, 116, 118, 120, 122, 126, 128, 130 and 132 will be described below. However, steps 114, 124 and 132 may be omitted.

It is continuously checked whether the dial knob has been rotated in a first direction (step 110). Here, the dial knob may be an arbitrary dial-type member which is rotatably attached to the vehicle.

For example, the dial knob may be a dedicated knob disposed in the vehicle in order to perform the vehicle control method and apparatus according to the embodiment.

Alternatively, any one of various dial-type knobs operated to perform one of various functions of the vehicle may also operate as a dial knob. In order to operate such a dual-purpose knob as a dial knob used to perform the vehicle control method according to the embodiment, the dual-purpose knob may be operated by a user in a predetermined manner. For example, the dual-purpose knob may serve as a dial knob for performing the vehicle control method according to the embodiment, when being pressed by the user.

The dial knob may be located on an instrument panel such as a center fascia, and the embodiment is not limited to a specific location where the dial knob is located.

Figure 2A:
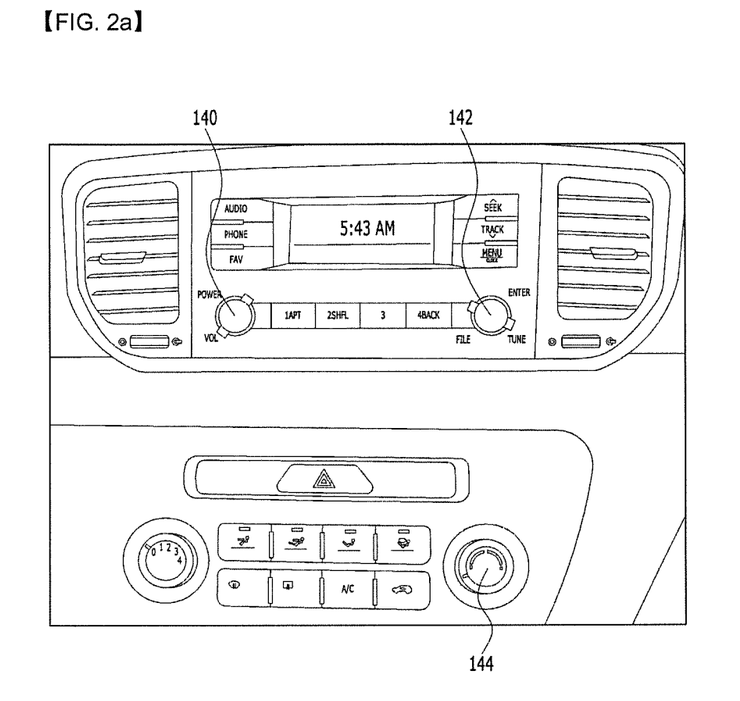
FIGS. 2a and 2b are diagrams illustrating types of dial knobs.
Figure 2B:
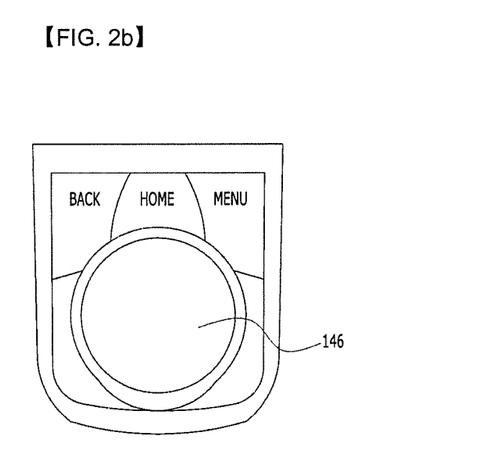

FIGS. 2a and 2b are diagrams illustrating types of dial knobs.

For example, any one of first, second and third knobs 140, 142 and 144 shown in FIG. 2a may be a dual-purpose knob used as a dial knob. The first knob 140 corresponds to a power or volume knob located on the instrument panel and operated upon turning on/off an audio device, the second knob 142 corresponds to a tuner knob for tuning audio, and the third knob 144 corresponds to an air conditioning temperature knob for adjusting air temperature. Alternatively, as shown in FIG. 2b, a center console knob 146 located on a center console of the vehicle may correspond to a dual-purpose knob used as a dial knob. In this case, each of the power knob, the volume knob, the tuner knob, the air conditioning temperature knob and the center console knob may operate as a dial knob operated by the user to perform each of the above-described functions.

When the dual-purpose knob according to the embodiment serves as a dial knob, the dual-purpose knob may be operated in a manner different from that of the dual-purpose knob operated to perform the inherent function thereof. The manner, in which the dual-purpose knob is operated in order to serve as the dial knob, and the manner, in which the dual-purpose knob is operated in order to perform the inherent function thereof, may be predetermined by the user.

That is, the dual-purpose knob may be operated using a first or second operation method, in order to be used as the dial knob. Here, the first operation method may mean a method of operating the dual-purpose knob to perform the inherent function thereof, and the second operation method may mean a method of operating the dual-purpose knob to serve as the above-described dial knob instead of the inherent function thereof.

For example, the user may rotate the air conditioning temperature knob in a first direction or a second direction in order to control the internal temperature of the vehicle. However, when the user performs the method 100 or 200 shown in FIG. 1 or 5 using the air conditioning temperature knob, the user may operate the air conditioning temperature knob in a manner different from a general manner (that is, a manner of rotating the air conditioning temperature knob in the first or second direction), for example, push the air conditioning temperature knob, such that the air conditioning temperature knob serves as the dial knob for performing the vehicle control method according to the embodiment.

However, the dial knob according to the embodiment is not limited to the knob shown in FIG. 2a or 2b.

In addition, the dial knob according to the embodiment may rotate in the first direction or the second direction or may be folded in the forward direction (i.e., upward) of the vehicle or in the backward direction (i.e., downward) of the vehicle.

The first direction in which the dial knob is rotated is any one of a clockwise direction (CD) and a counterclockwise direction (CCD), and the second direction in which the dial knob is rotated may be the remaining direction of the CD and the CCD. The first direction and the second direction may be opposite to each other.

Referring to FIG. 1 again, when the dial knob has been rotated in the first direction, a numerical value (hereinafter referred to as a first numerical value) obtained by numeralizing the degree of rotation of the dial knob in the first direction may be generated and operation data reflecting the first numerical value may be stored (steps 112, 114 and 116). This will now be described in detail.

If the dial knob has been rotated in the first direction, the first numerical value obtained by numeralizing the degree of rotation of the dial knob in the first direction is generated (step 112). Numeralizing will be described in detail in step 122.

After step 112, it may be checked whether the dial knob has been rotated in the first direction as a first predetermined time has elapsed after the dial knob has been operated before step 110 (step 114). That is, it may be checked whether the dial knob has been rotated in the first direction as the first predetermined period has elapsed after the dial knob has been rotated in the second direction before step 110.

Alternatively, it may be checked whether the dial knob has been rotated in the first direction as the first predetermined period has elapsed after the numerical value obtained before step 110 has been stored (step 114). That is, it may be checked whether the dial knob has been rotated in the first direction as the first predetermined period has elapsed after the second numerical value has been stored before step 110 (step 114).

If the dial knob has been rotated in the first direction as the first predetermined period has elapsed after the dial knob has been rotated in the second direction, pre-stored operation data may be deleted without storing the first numerical value (step 132). Alternatively, if the dial knob has been rotated in the first direction as the first predetermined time has elapsed after the second numerical value has been stored in step 126, pre-stored operation data may be deleted without storing the first numerical value (step 132).

However, if the dial knob has been rotated in the first direction before the first predetermined period elapses after the dial knob has been rotated in the second direction, operation data reflecting the first numerical value may be stored (step 116). Alternatively, if the dial knob has been rotated in the first direction before the first predetermined period elapses after the second numerical value has been stored, operation data reflecting the first numerical value may be stored (step 116).

After step 116, it is checked whether the stored operation data corresponds to control data (step 118). If the stored operation data corresponds to the control data, the vehicle is controlled using the control data (step 130).

At this time, vehicle control using the control data may vary. For example, any one of a vehicle navigation function such as traffic information and route guidance to a destination or various multimedia services such as audio/video (AV) functions such as listening to music using a CD, watching video and watching TV may be performed using the control data, thereby controlling the vehicle. In addition, a generated telephone number may be called by the control data, the frequency of a broadcast station may be selected by the control data, or any function provided by the vehicle may be performed by the control data.

However, if the stored operation data does not correspond to the control data, it is continuously checked whether the dial knob has been rotated in the second direction opposite to the first direction (step 120). If the dial knob has been rotated in the second direction, a numerical value (hereinafter referred to as a second numerical value in order to be distinguished from the first numerical value) obtained by numeralizing the degree of rotation of the dial knob in the second direction may be generated and operation data reflecting the second numerical value may be stored (steps 122 to 126). At this time, reflecting the second numerical value in the operation data may mean that the second numerical value is combined with the first numerical value when the first numerical value is stored as operation data. Steps 122 to 126 will now be described in detail.

When the dial knob has been rotated in the second direction, the second numerical value obtained by numeralizing the degree of rotation of the dial knob in the second direction is generated (step 122).

The first numerical value (or the second numerical value) corresponding to the degree of rotation of the dial knob in the first direction (or the second direction) may be digitized and predetermined. For example, when the dial knob has been rotated 1, 2, 3, 4, 5, 6, 7, 8, 9 or 10 spaces in the first direction (or in the second direction), the first numerical value (or the second numerical value) may be predetermined as "1", "2", "3", "4", "5", "6", "7", "8", "9" or "0". If the dial knob has been rotated more than 10 spaces in the first direction (or in the second direction), the first numerical value (or the second numerical value) may be predetermined as the units digit. For example, if the dial knob has been rotated 24 spaces in the first direction (or in the second direction), the first numerical value (or the second numerical value) may be "4" which is the units digit. In addition, if the dial knob has been rotated 30 spaces in the first direction (or in the second direction), the first numeral value (or the second numerical value) may be "0" which is the units digit. The number of spaces which the dial knob has been rotated may be generated as the first numerical value (or the second numerical value).

Meanwhile, after step 122, it may be checked whether the dial knob has been rotated in the second direction as a second predetermined time has elapsed after the dial knob has been operated before step 120 (step 124). That is, it may be checked whether the dial knob has been rotated in the second direction as the second predetermined period has elapsed after the dial knob has been rotated in the first direction before step 120.

Alternatively, it may be checked whether the dial knob has been rotated in the second direction as the second predetermined period has elapsed after the first numerical value has been stored before step 120 (step 124).

If the dial knob has been rotated in the second rotation after the second predetermined period has elapsed after the dial knob has been rotated in the first direction, pre-stored operation data may be deleted without storing the second numerical value generated in step 122 (step 132). Alternatively, if the dial knob has been rotated in the second direction after the second predetermined time has elapsed after the first numerical value has been stored in step 116, pre-stored operation data may be deleted without storing the second numerical value generated in step 122 (step 132).

However, if the dial knob has been rotated in the second direction before the second predetermined period elapses after the dial knob has been rotated in the first direction, operation data reflecting the second numerical value is stored (step 126). Alternatively, if the dial knob has been rotated in the second direction before the second predetermined period elapses after the first numerical value has been stored in step 116, operation data reflecting the second numerical value is stored (step 126).

The first predetermined period and the second predetermined period may be equal to or different from each other. For example, although the first and second predetermined periods may be 3 seconds, the embodiment does not limit the first and second predetermined periods to a specific value.

After step 126, it is checked whether the stored operation data corresponds to control data (step 128). That is, operation data in which the first numerical value and the second numerical value are combined is stored in step 126 and it is checked whether the stored operation data corresponds to control data (step 128).

If the stored operation data corresponds to control data, the vehicle is controlled using the control data (step 130). However, if the stored operation data does not correspond to the control data, the method returns to step 110.

Next, the vehicle control method 100 according to the embodiment including not only steps 110, 112, 114, 124, 116, 118, 120, 122, 126, 128, 130 and 132 but also steps 111, 113, 1121 and 123 will be described.

Referring to FIG. 1, when the dial knob has not been rotated in the first direction, it may be checked whether the dial knob has been folded (or pressed or tilted) (step 111). If the dial knob has been pressed, a predetermined symbol (hereinafter referred to as a first symbol) predetermined with respect to operation of folding the dial knob may be generated (step 113).

After step 113, it may be checked whether the dial knob has been pressed as the first predetermined period has elapsed after the dial knob has been operated before step 111 (step 114). That is, it may be checked whether the dial knob has been pressed as the first predetermined time has elapsed after the dial knob has been rotated in the second direction before step 110.

Alternatively, it may be checked whether the dial knob has been pressed as the first predetermined time has elapsed after the second numerical value has been stored before step 111 (step 114).

If the dial knob has been pressed as the first predetermined period has elapsed after the dial knob has been rotated in the second direction, pre-stored operation data may be deleted without storing the first symbol (step 132). Alternatively, if the dial knob has been pressed as the first predetermined period has elapsed after the second numerical value has been stored in step 126, pre-stored operation data may be deleted without storing the first symbol (step 132).

However, if the dial knob has been pressed before the first predetermined time elapses after the dial knob has been rotated in the second direction, operation data reflecting the first symbol may be stored (step 116). Alternatively, if the dial knob has been pressed before the first predetermined time elapses after the second numerical value has been stored, operation data reflecting the first symbol may be stored (step 116). Step 118 may be performed after step 116. Step 118 is the same as described above and thus a repeated description thereof will be omitted.

In addition, after step 118, if the dial knob has not been rotated in the second direction, it may be checked whether the dial knob has been pressed (or, tilted) (step 121). If the dial knob has been pressed, a symbol (hereinafter referred to as a second symbol) is generated (step 123).

After step 123, it may be checked whether the dial knob has been pressed as the second predetermined time has elapsed after the dial knob has been operated before step 121 (step 124). That is, it may be checked whether the dial knob has been pressed as the second predetermined period has elapsed after the dial knob has been rotated in the first direction before step 121. Alternatively, it may be checked whether the dial knob has been pressed as the second predetermined time has elapsed after the first numerical value has been stored before step 121 (step 124).

If the dial knob has been pressed as the second predetermined period has elapsed after the dial knob has been rotated in the first direction, pre-stored operation data may be deleted without storing the second symbol generated in step 123 (step 132). Alternatively, if the dial knob has been pressed as the second predetermined time has elapsed after the first numerical value or the first symbol has been stored in step 116, pre-stored operation data may be deleted without storing the second symbol generated in step 123 (step 132).

However, if the dial knob has been pressed before the second predetermined period elapses after the dial knob has been rotated in the first direction, operation data reflecting the second symbol is stored (step 126). Alternatively, if the dial knob has been pressed before the second predetermined period elapses after the first numerical value has been stored in step 116, operation data reflecting the second symbol is stored (step 126). Alternatively, if the dial knob has been pressed again before the second predetermined time elapses after the dial knob has been pressed before step 121, operation data reflecting the second symbol is stored (step 126). Alternatively, if the dial knob has been pressed before the second predetermined period elapses after the first symbol has been stored in step 116, operation data reflecting the second symbol is stored (step 126). Steps 128 to 132 are performed after step 126. Steps 128 to 132 are the same as described above and thus a repeated description thereof will be omitted.

Meanwhile, in each of steps 118 and 128, in order to check whether operation data corresponds to control data, a relationship between the operation data and the control data may be predetermined. That is, the relationship between the operation data and the control data may be predetermined before the method shown in FIG. 1 is performed.

Hereinafter, a method of presetting a relationship between operation data and control data will be described with reference to FIG. 3.

FIGS. 3(a) to 3(d) are diagrams illustrating a method of presetting a relationship between operation data and control data.

Figure 3A:
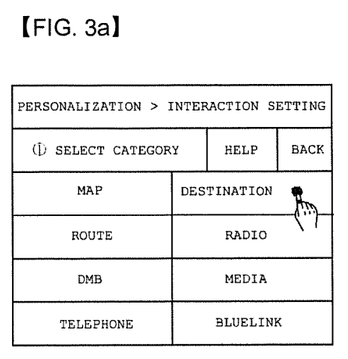
FIGS. 3(a), 3(b), 3(c), and 3(d) are diagrams illustrating a method of presetting a relationship between operation data and control data.

A user may select one of various categories shown in FIG. 3(a), such as "map", "destination", "route", "radio", "DMB", "media", "telephone" and "Bluelink". For example, although the user may select a category "destination" shown in FIG. 3(a), the embodiment does not limit the type of the category selectable by the user.

Figure 3B:
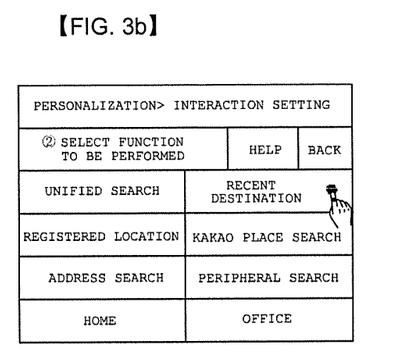

Thereafter, if "destination" is selected from among various categories, the user may select one of a plurality of functions shown in FIG. 3(b) included in the category "destination". As shown in FIG. 3(b), the category "destination" may include various functions such as unified search, recent destination, registered location, Kakao place search, address search, peripheral search, home and office, but the embodiment does not limit the types of the functions included in the selected category.

As shown in FIGS. 3(a) to 3(d), although the relationship between the operation data and the control data may be preset by user selection of a category, a function, a number or a symbol using a graphical user interface (GUI) method, the embodiment is not limited thereto.

Figure 3C:
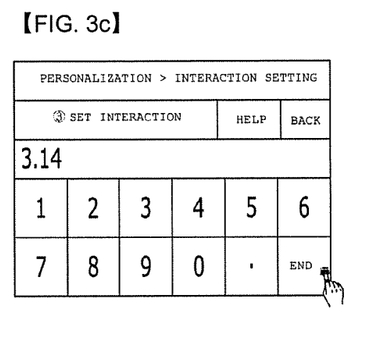
Figure 3D:
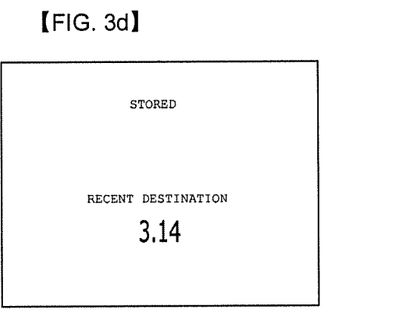

If the user selects a function "recent destination" shown in FIG. 3(b), as shown in FIG. 3(c), numbers and symbols may be listed and displayed to the user, such operation data corresponding to "recent destination" is generated. At this time, the user may set operation data corresponding to the function "recent destination" to 3.14. That is, when the user operates the dial knob to generate operation data of 3.14, since the operation data of 3.14 corresponds to control data for performing the function "recent destination", the vehicle may be controlled to be guided to the recent destination.

Hereinafter, to facilitate understanding of the vehicle control method according to the embodiment shown in FIG. 1, a process in which the user operates the dial knob to guide the vehicle to a recent destination will be described.

When the user rotates the dial knob three spaces in the first direction (e.g., the clockwise direction), a first numerical value "3" is generated (step 112). Thereafter, if the dial knob has been rotated three spaces in the first direction before the first predetermined period elapses after the dial knob has been rotated in the second direction or after the second numerical value has been stored, operation data reflecting the first numerical value "3" is stored (steps 114 and 116).

Thereafter, the stored operation data, that is, the first numerical value "3", and the control data, that is, "3.14", are compared. Since the first numerical value "3" does not correspond to the control data, the method advances to step 120.

Thereafter, it is checked whether the user has been rotated the dial knob in the second direction opposite to the first direction (step 120). At this time, upon determining that the user has not been rotated the dial knob in the second direction, it is checked whether the dial knob has been pressed (step 121).

Thereafter, when the user folds the dial knob after rotating the dial knob three spaces in the first direction, a symbol is generated (step 123). A period which is the second symbol may be predetermined to be generated when the dial knob is pressed, before the method 100 shown in FIG. 1 is performed. If the dial knob has been pressed before the second predetermined period elapses after operation data reflecting the first numerical value "3" has been stored or before the second predetermined period elapses after the dial knob has been rotated three spaces in the first direction, operation data reflecting a period ".", which is the second symbol, is stored (steps 124 and 126). The operation data reflecting the first numerical value "3" has been already stored. Accordingly, "3." obtained by combining the period ".", which is the second symbol, with the first numerical value "3" may be stored as operation data.

Thereafter, if the stored operation data, that is, "3.", does not correspond to "3.14", which is the control data, the method returns to step 110 to check whether the dial knob has been rotated in the first direction. At this time, in order to perform the function "recent destination", the user may rotate the dial knob one space in the first direction. In this case, the first numeral value "1" is generated (step 112).

After step 112, it is checked whether the dial knob has been rotated in the first direction as the first predetermined period has elapsed after the dial knob has been pressed (step 114). Alternatively, it may be checked whether the dial knob has been rotated in the first direction as the first predetermined period has elapsed after the period, which is the second symbol, has been stored in step 126 (step 114).

If the dial knob has been rotated one space in the first direction before the first predetermined period elapses after the operation data reflecting the second symbol has been stored or after the dial knob has been pressed, operation data obtained by reflecting the first numerical value "1" generated in step 112 to the pre-stored operation data "3." is stored (step 116). Accordingly, "3.1" is stored as operation data in step 116. Thereafter, since operation data "3.1" does not correspond to "3.14", which is the control data, the method advances to step 120 to check whether the dial knob has been rotated in the second direction (step 120). At this time, in order to perform the function "recent destination", the user may rotate the dial knob four spaces in the second direction. In this case, the second numeral value "4" is generated (step 122).

After step 122, it is checked whether the dial knob has been rotated four spaces in the second direction as the second predetermined time has elapsed after the dial knob has been rotated one space in the first direction (step 124). Alternatively, it may be checked whether the dial knob has been rotated four spaces in the second direction as the second predetermined time has elapsed after the operation data reflecting the first numerical value "1" has been stored (step 124).

If the dial knob has been rotated four spaces in the second direction before the second predetermined period elapses after the operation data reflecting the first numerical value has been stored or after the dial knob has been rotated in the first direction, operation data obtained by reflecting the second numerical value "4" generated in step 122 to the pre-stored operation data "3.1" is stored (step 126). Accordingly, "3.14" is stored as operation data in step 126. Thereafter, it is checked whether the operation data "3.14" corresponds to the control data "3.14" (step 128).

As described above with reference to FIGS. 3(a) to 3(d), the control data "3.14" is preset in order to perform the function "recent destination". Accordingly, since the pre-stored operation data "3.14" corresponds to the control data, the vehicle is controlled to be guided to the recent destination using the control data "3.14" (step 130).

Although operation of folding the dial knob is predetermined to generate the second symbol ".", the embodiment is not limited thereto and operation of folding the dial knob may be determined to generate various symbols other than the symbol ".". Alternatively, operation different from operation of folding the dial knob may be predetermined to generate the symbol ".".

In addition, the operation data corresponding to at least one combination of the first numerical value, the second numerical value, the first symbol or the second symbol may be one word. Accordingly, each of the first numerical value, the second numerical value, the first symbol and the second symbol may be a minimum unit configuring one word. For example, if the word is in Korean, the first numerical value, the second numerical value, the first symbol and the second symbol may be one-to-one mapped to a consonant or a vowel. If the word is in English, each of the first numerical value, the second numerical value, the first symbol and the second symbol may be mapped to a letter.

Figure 4:
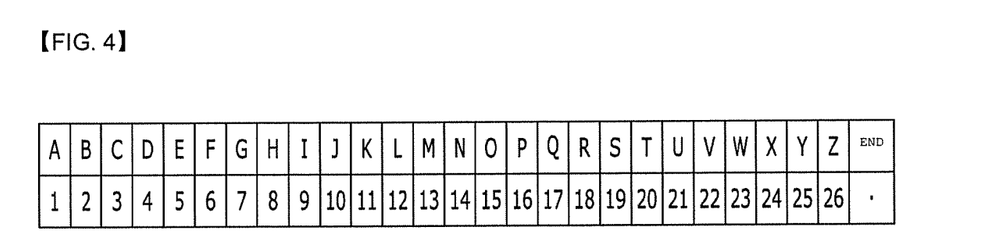
FIG. 4 is an exemplary table in which each of a first numerical value, a second numerical value, a first symbol and a second symbol is mapped to an alphabet.

FIG. 4 is an exemplary table in which each of a first numerical value, a second numerical value, a first symbol and a second symbol is mapped to a letter.

In FIG. 4, each of numerical values 1 to 26 indicates a first or second numerical value as the number of spaces which the dial knob is rotated, and a period indicates a first or second symbol generated when the dial knob is pressed.

Accordingly, when the user rotates the dial knob 18 spaces in the first direction, rotates the dial knob one spaces in the second direction, rotates the dial knob four spaces in the first direction, rotates the dial knob nine spaces in the second direction, rotates the dial knob 15 spaces in the first direction and then folds the dial knob, operation data stored by combining the first and second numerical values and the second symbol may be "(18)(1)(4)(9)(15)(.)". At this time, a word obtained by the operation data is "RADIO". Accordingly, since the operation data corresponds to the control data for performing the function "radio", the vehicle is controlled to operate the radio.

Figure 5:
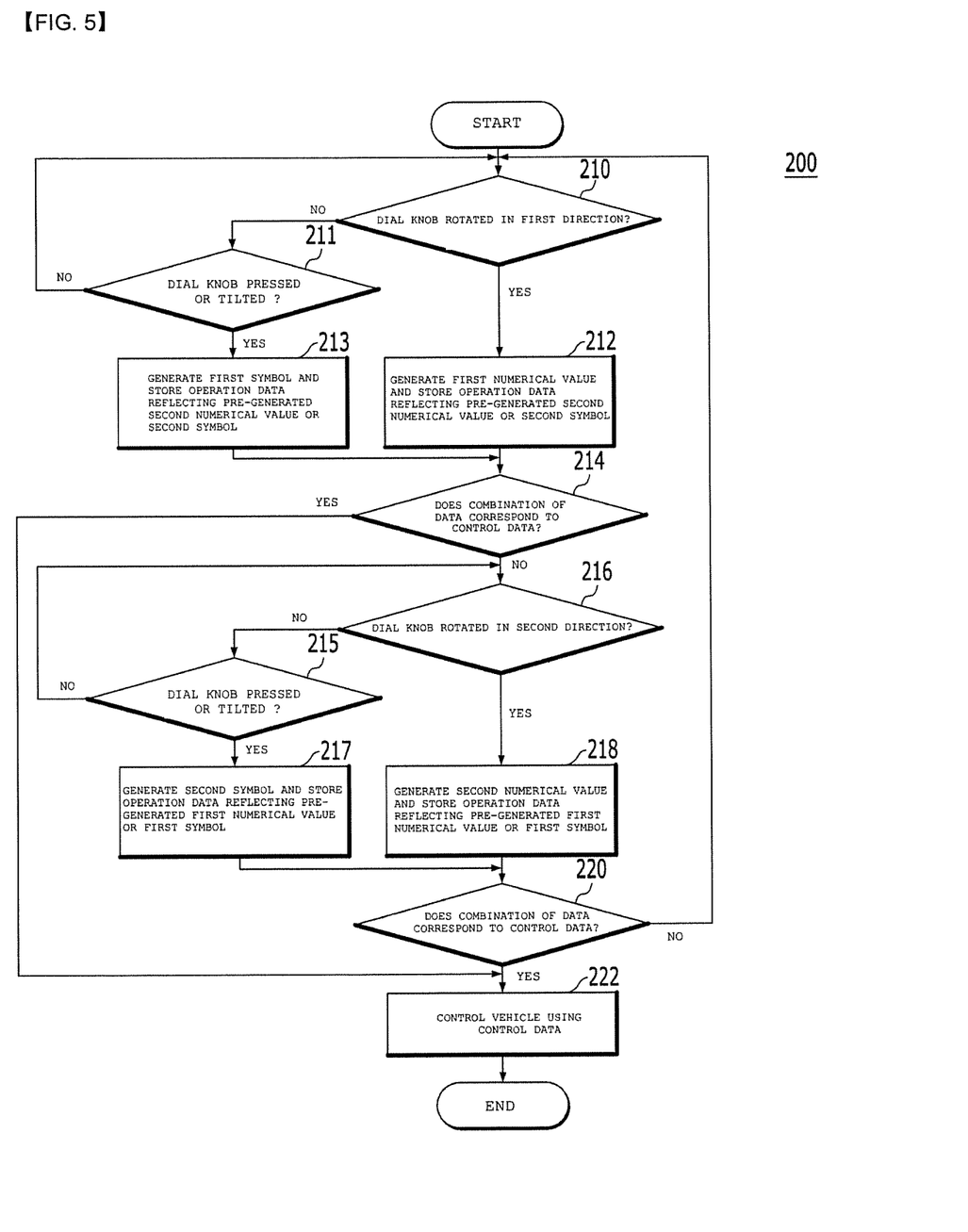
FIG. 5 is a flowchart illustrating a method of controlling a vehicle according to another embodiment.

FIG. 5 is a flowchart illustrating a method 200 of controlling a vehicle according to another embodiment The vehicle control method 200 according to another embodiment may include steps 210, 212, 214, 216, 218, 220 and 222. In addition, the vehicle control method 200 may further include steps 211 and 213. In addition, the vehicle control method 200 may further include steps 215 and 217.

First, the vehicle control method 200 according to another embodiment including steps 210, 212, 214, 216, 218, 220 and 222 will be described.

Referring to FIG. 5, it is continuously checked whether the dial knob has been rotated in the first direction (step 210).

If the dial knob has been rotated in the first direction, a first numerical value obtained by numeralizing a degree of rotation of the dial knob may be generated (step 212).

After step 212, it is checked whether a combination of the generated first numerical value and pre-stored operation data corresponds to control data (step 214).

If the combination of the generated first numerical value and the pre-stored operation data corresponds to the control data, the vehicle is controlled using the control data (step 222). However, if the combination of the generated first numerical value and the pre-stored operation data does not correspond to the control data, it is continuously checked whether the dial knob has been rotated in the second direction opposite to the first direction (step 216).

If the dial knob has been rotated in the second direction, operation data reflecting the first numerical value generated in step 212 is stored and a second numerical value obtained by numeralizing a degree of rotation of the dial knob in the second direction is generated (step 218).

After step 218, it is checked whether a combination of the generated second numerical value and the pre-stored operation data corresponds to the control data (step 220).

If the combination of the generated second numerical value and the pre-stored operation data corresponds to the control data, the vehicle is controlled using the control data (step 222).

However, if the combination of the generated second numerical value and the pre-stored operation data does not correspond to the control data, the method returns to step 210. Thereafter, when the dial knob is rotated in the first direction, operation data reflecting the second numerical value generated in step 218 is stored (step 212).

Next, the vehicle control method 200 according to another embodiment including not only steps 210, 212, 214, 216, 218, 220 and 222 but also steps 211, 213, 215 and 217 will be described.

If the dial knob has not been rotated in the first direction, it may be checked whether the dial knob has been pressed or tilted (step 211).

If the dial knob has been pressed, the first symbol corresponding to folding operation may be generated (step 213).

After step 213, it is checked whether a combination of the generated first symbol and the pre-stored operation data corresponds to the control data (step 214).

If the combination of the generated first symbol and the pre-stored operation data corresponds to the control data, the vehicle is controlled using the control data (step 222).

However, if combination of the generated first symbol and the pre-stored operation data does not correspond to the control data, it is checked whether the dial knob has been rotated in the second direction opposite to the first direction (step 216).

If the dial knob has not been rotated in the second direction, it is checked whether the dial knob has been pressed or tilted (step 215). If the dial knob has been pressed, a second symbol is generated and operation data reflecting the first numerical value generated in step 212 or the first symbol generated in step 213 is stored (step 217).

However, if the dial knob has been rotated in the second direction, the second numerical value obtained by numeralizing a degree of rotation of the dial knob in the second direction is generated and operation data reflecting the first numerical value generated in step 212 or the first symbol generated in step 213 is stored (step 218). After step 218, it is checked whether a combination of the generated second numerical value or second symbol and the pre-stored operation data corresponds to the control data (step 220). If the combination of the generated second numerical value or second symbol and the pre-stored operation data corresponds to the control data, the vehicle is controlled using the control data (step 222).

However, if the combination of the generated second numerical value or second symbol and the pre-stored operation data does not correspond to the control data, the method returns to step 210. Thereafter, when the dial knob is rotated in the first direction or is pressed, operation data reflecting the second numerical value or the second symbol is stored (step 212 or 213).

To facilitate understanding of the embodiment 200 shown in FIG. 5, the vehicle control method shown in FIG. 5, when the user operates the dial knob in order to listen to a radio program with a FM radio frequency of 107.7 MHz, will be described.

The user rotates the dial knob one space in the first direction. At this time, a first numerical value "1" is generated (step 212). Since "1" does not correspond to the control data, it is checked whether the user has been rotated the dial knob in the second direction (steps 214 and 216). Subsequently, the user rotates the dial knob ten spaces in the second direction. At this time, a second numerical value "0" is generated, and operation data reflecting the first numerical value "1" generated in step 212 is stored (step 218). Since a combination of the generated second numerical value "0" and the stored first numerical value "1", that is, "10", does not correspond to the control data, the method returns to step 210 to check whether the dial knob has been rotated in the first direction (steps 220 and 210). Subsequently, the user rotates the dial knob seven spaces in the first direction. At this time, operation data reflecting the second numerical value "0" generated in step 218 is stored and the first numerical value "7" is generated (step 212). Since a combination "107" of the generated first numerical value "7" and the stored operation data "10" does not correspond to the control data, the method advances to step 216 to check whether the dial knob has been rotated in the second direction (steps 214 and 216).

If the dial knob has not been rotated in the second direction, it is checked whether the dial knob has been pressed (step 215). Subsequently, the user folds the dial knob. At this time, a period " " which is the second symbol is generated and operation data reflecting the first numerical value "7" generated in step 212 is stored (step 217). Since a combination "107." of the generated second symbol "." and the pre-stored operation data does not correspond to the control data, the method returns to step 210 to check whether the dial knob has been rotated in the first direction (steps 220 and 210). Subsequently, the user rotates the dial knob seven spaces in the first direction. At this time, operation data reflecting the period "." which is the second symbol generated in step 217 is stored and the first numerical value "7" is generated (step 212). Since a combination "107.7" of the first numerical value "7" and the pre-stored operation data "107." corresponds to the control data, the vehicle is controlled to select and provide the FM broadcast program having 107.7 MHz, which is the control data, to the user (step 222).

As described above, AM or FM broadcast program may be selectively provided to the user depending on whether the dial knob is pressed or not, because the frequency of the AM broadcast does not have a period but the frequency of the FM broadcast has a period.

Hereinafter, a point in time when the first numerical value, the second numerical value, the first symbol and the second symbol are stored will be described.

According to one embodiment, step 114 may be omitted in the embodiment 100 shown in FIG. 1. In this case, the first numerical value is generated (step 112) and then is stored (step 116) or the first symbol is generated (step 113) and then stored (step 116). If step 124 is omitted, the second numerical value is generated (step 122) and then stored (step 126) or the second symbol is generated (step 123) and then stored (step 126). The first numerical value, the second numerical value, the first symbol and the second symbol may be stored, regardless of whether the rotation direction of the dial knob is changed or not.

According to another embodiment, the embodiment 100 shown in FIG. 1 may include step 114. In this case, the first numerical value or the first symbol is stored (step 116) only when the dial knob has been rotated in the first direction before the first predetermined time elapses after the dial knob has been pressed or after the dial knob has been rotated in the second direction. In addition, the embodiment 100 shown in FIG. 1 may include step 124. In this case, the second numerical value or the second symbol is stored (step 116) only when the dial knob has been rotated in the second direction before the second predetermined period elapses after the dial knob has been pressed or after the dial knob has been rotated in the first direction. The first numerical value, the second numerical value, the first symbol and the second symbol may be stored only when operation of changing the rotation direction of the dial knob is performed within the first or second predetermined period.

According to another embodiment, as shown in FIG. 5, the first numerical value generated after rotating the dial knob in the first direction may be stored after the dial knob is rotated in the second direction opposite to the first direction. In addition, the first symbol generated after folding the dial knob may be stored after the dial knob is rotated in the second direction. In addition, the second numerical value generated after the dial knob is rotated in the second direction may be stored after the dial knob is rotated in the first direction opposite to the second direction. In addition, the first symbol generated after folding the dial knob may be stored after the dial knob is rotated in the second direction. In the embodiment shown in FIG. 5, the first numerical value, the second numerical value, the first symbol or the second symbol may be stored whenever operation of the dial knob is changed (e.g., whenever the rotation direction of the dial knob is changed), regardless of whether the first or second predetermined period has elapsed.

Hereinafter, an apparatus 300 for controlling a vehicle according to an embodiment for performing the method 100 or 200 shown in FIG. 1 or 5 will be described with reference to FIG. 6. However, the method shown in FIG. 1 or 5 may be performed in another vehicle control apparatus and the embodiment is not limited thereto.

Figure 6:
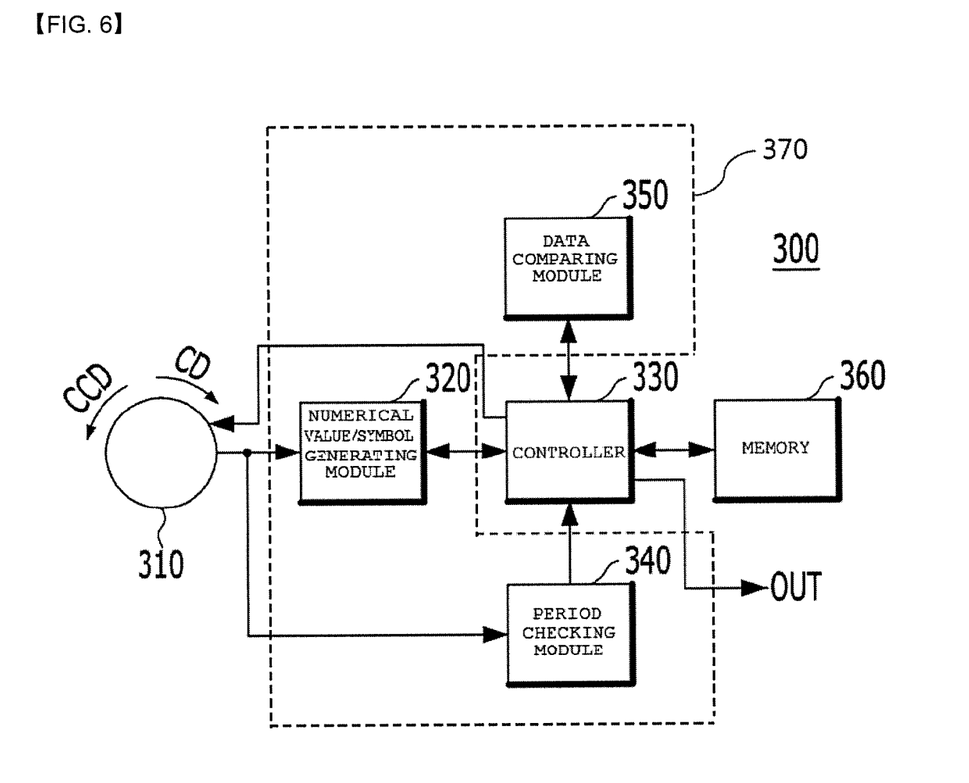
FIG. 6 is a block diagram of an apparatus for controlling a vehicle according to an embodiment.

FIG. 6 is a block diagram of an apparatus 300 for controlling a vehicle according to an embodiment, which may include a dial knob 310, a processor 370, a controller 330, and a memory 360. The processor 370 has an associated non-transitory memory storing software instructions which, when executed by the processor 370, provides the functionalities of a numerical value/symbol generating module 320 and a data comparing module 350. In addition, the software instructions of the processor 370 may further provide the functionalities of a period checking module 340. Here, the controller 330 may process signals transmitted between elements of the apparatus 300, and in particular may process signals communicated between the dial knob 310, the processor 370, and the memory 360. The processor 370 may take the form of one or more processor(s) and associated memory storing program instructions, and in some examples the one or more processor(s) may be used to implement the functions of both the controller 330 and the processor 370.

The dial knob 310 may be rotated in a first or second direction or may be folded upward or downward by a user.

Under control of the controller 330, the numerical value/symbol generating module 320 may generate a first numerical value when the dial knob 310 is rotated in the first direction, generate a second numerical value when the dial knob 310 is rotated in the second direction, generate a first or second symbol when the dial knob 310 is pressed, and output the generated first and second numerical values and the first or second symbol to the controller 330. That is, the controller 330 may control the numerical value/symbol generating module 320 to perform steps 112, 113, 122 and 123 and to perform some of steps 212, 213, 217 and 218.

That is, the controller 330 may detect whether the dial knob 310 has been rotated in the first or second direction or has been pressed and control the numerical value/symbol generating module 320 such that the numerical value/symbol generating module 320 generates the first numerical value, the second numerical value, the first symbol and the second symbol according to the result of detection. That is, the controller 330 may control the numerical value/symbol generating module 320 to generate the first symbol (step 113) when the dial knob 310 is first pressed without rotating in any direction or when the dial knob 310 is pressed after rotating in the second direction or to generate the second symbol (step 123) when the dial knob 310 is pressed after rotating in the first direction or when the dial knob 310 is secondly pressed without rotating in any direction.

Under control of the controller 330, the memory 360 may store operation data reflecting at least one of the generated first numerical value, second numerical value, first symbol or second symbol. That is, the memory 360 may perform steps 116 and 126 or perform some of steps 212, 213, 217 and 218.

Under control of the controller 330, the memory 360 may store at least one of the first numerical value, the second numerical value, the first symbol or the second symbol as follows.

According to one embodiment, if the embodiment 100 shown in FIG. 1 does not include steps 114 and 124, the vehicle control apparatus 300 does not include the period checking module 340. In this case, whenever the numerical value/symbol generating module 320 generates the first numerical value, the second numerical value, the first symbol or the second symbol, the controller 330 may store the first numerical value, the second numerical value, the first symbol or the second symbol in the memory 360.

According to another embodiment, if the embodiment 100 shown in FIG. 1 includes steps 114 and 124, the vehicle control apparatus 300 may further include the period checking module 340. The period checking module 340 checks whether the dial knob 310 has been rotated in the first direction or has been pressed as the first predetermined period has elapsed after the second numerical value or the second symbol has been stored in the memory 360 or after the dial knob 310 has been rotated in the second direction (step 114), and outputs the checked result to the controller 330. In addition, the period checking module 340 checks whether the dial knob 310 has been rotated in the second direction or has been pressed as the second predetermined period has elapsed after the first numerical value or the first symbol has been stored in the memory 360 or after the dial knob 310 has been rotated in the first direction (step 124), and outputs the checked result to the controller 330. At this time, the controller 330 may store operation data reflecting the first numerical value, the second numerical value, the first symbol and the second symbol in the memory 360 in response to the result checked by the period checking module 340 (steps 116 and 126) and initialize, that is, delete, the operation data stored in the memory 360 (step 132).

According to another embodiment, the vehicle control apparatus 300 for performing the embodiment 200 shown in FIG. 5 may not include the period checking module 340. In this case, the controller 330 may store the first numerical value, the second numerical value, the first symbol or the second symbol generated by the numerical value/symbol generating module 320 in the memory 360 when operation of the dial knob 310 is changed. For example, the first numerical value generated by rotating the dial knob 310 in the first direction may be stored in the memory 360 when the dial knob 310 is rotated in the second direction opposite to the first direction. To this end, the controller 330 may detect operation change (that is, change in rotation direction) of the dial knob 310 and store the first numerical value, the second numerical value, the first symbol or the second symbol in the memory 360 in response to the result of detection.

Meanwhile, under control of the controller 330, the data comparing module 350 reads the operation data stored in the memory 360, compares the read operation data with the control data, and outputs the result of comparison to the controller 330. That is, the data comparing module 350 may perform steps 118, 128, 214 and 220.

The controller 330 may read the operation data stored in the memory 360 and output the read operation data through an output terminal OUT as the control data, in response to the result of comparison in the data comparing module 350. That is, the data comparing module 350 and the controller 330 may perform step 130 shown in FIG. 1 and step 222 shown in FIG. 5.

According to the vehicle control method and apparatus of the above-described embodiments, the numerical values or the symbols may be generated by rotating the dial knob in the clockwise or counterclockwise direction or folding the dial knob, the generated numerical values or symbols may be combined to generate and store operation data, the stored operation data may be compared with the control data, and the vehicle may be controlled to perform the function corresponding to the operation data.

In particular, as shown in FIG. 5, when the dial knob is rotated in the first direction and then is rotated in the second direction opposite to the first direction, the first numerical value generated by rotation of the dial knob in the first direction is stored, and the second numerical value is generated by rotation of the dial knob in the second direction. Alternatively, when the dial knob is rotated in the second direction and then is rotated in the first direction opposite to the second direction, the second numerical value generated by rotation of the dial knob in the second direction is stored, and the first numerical value is generated by rotation of the dial knob in the first direction. In the vehicle control method and apparatus according to the embodiment, since the operation data is generated and stored by alternately rotating the dial knob in the first direction and the second direction, the principle of a lock may be used.

In addition, according to the embodiment, since the operation data corresponding to the control data is generated by alternately rotating the dial knob in the first direction and the second direction, the driver of the vehicle may generate the control data for controlling the vehicle while looking ahead, thereby preventing unstable situations caused by operating a switch or a button without looking ahead in order to perform the function of the vehicle during driving.

In addition, since a desired function is easily selected from among a vehicle navigation function, a multimedia function and various functions of the vehicle by rotating the dial knob only, the driver may take an interest in control (operation) of the vehicle.

In addition, as described above, according to the vehicle control method and apparatus according to the embodiments, since one of the functions of the vehicle is selected by operating only the dial knob, a human-machine interface (HMI) is applicable to the vehicle, a communication control processor (CCP) of a vehicle or a physical user interface (PUI) apparatus.

In the vehicle control method and apparatus using the dial knob according to the embodiments, since the driver of the vehicle may generate the control data for controlling the vehicle while looking ahead, it is possible to prevent unstable situations caused by operating a switch or a button without looking ahead in order to perform the function of the vehicle during driving. In addition, since a desired function is easily selected from among a vehicle navigation function, a multimedia function and various functions of the vehicle, the driver may take an interest in control (operation) of the vehicle.

The above-described various embodiments may be combined with each other without departing from the object of the present disclosure unless being contrary to each other. In addition, for any element, which is not described in detail, of any of the various embodiments, refer to the description of the element having the same reference numeral of another embodiment.

While the present disclosure has been particularly shown and described with reference to exemplary embodiments thereof, these embodiments are only proposed for illustrative purposes and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. A method of controlling a vehicle using a dial knob, the method comprising steps of:
   (a1) generating a first numerical value obtained by numeralizing a degree of rotation of the dial knob in a first direction, and storing operation data reflecting the first numerical value;
   (b1) controlling the vehicle using control data, if the stored operation data corresponds to the control data;
   (c1) generating a second numerical value obtained by numeralizing a degree of rotation of the dial knob in a second direction opposite to the first direction, and storing operation data reflecting the second numerical value, if the operation data does not correspond to the control data; and
   (d1) controlling the vehicle using the control data if the stored operation data corresponds to the control data, and returning to the step (a1) if the operation data does not correspond to the control data.

2. The method according to claim 1, wherein the step (a1) comprises:
   checking whether the dial knob has been rotated in the first direction;
   generating the first numerical value if the dial knob has been rotated in the first direction;
   storing the operation data reflecting the first numerical value if the dial knob has been rotated in the first direction before a first predetermined period elapses after the dial knob has been rotated in the second direction or after the second numerical value has been stored; and
   deleting the stored operation data without storing the first numerical value if the dial knob has been rotated in the first direction as the first predetermined period has elapsed after the dial knob has been rotated in the second direction or after the second numerical value has been stored.

3. The method according to claim 2, the step (a1) further comprises:
   checking whether the dial knob has been pressed if the dial knob has not been rotated in the first direction;
   generating a first symbol if the dial knob has been pressed;
   storing the operation data reflecting the first symbol if the dial knob has been pressed before a first predetermined time elapses after the dial knob has been rotated in the second direction or after the second numerical value has been stored; and deleting the stored operation data without storing the first symbol if the dial knob has been pressed as the first predetermined period has elapsed after the dial knob has been rotated in the second direction or after the second numerical value has been stored.

4. The method according to claim 3, wherein the step (c1) comprises:

checking whether the dial knob has been rotated in the second direction;

generating the second numerical value if the dial knob has been rotated in the second direction;

storing the operation data reflecting the second numerical value if the dial knob has been rotated in the second direction before a second predetermined period elapses after the dial knob has been rotated in the first direction or after the first numerical value has been stored; and deleting the stored operation data without storing the second numerical value if the dial knob has been rotated in the second direction as the second predetermined period has elapsed after the dial knob has been rotated in the first direction or after the first numerical value has been stored.

5. The method according to claim 4, the step (c1) further comprises:

checking whether the dial knob has been pressed if the dial knob has not been rotated in the second direction;

generating a second symbol if the dial knob has been pressed;

storing the operation data reflecting the second symbol if the dial knob has been pressed before a second predetermined time elapses after the dial knob has been rotated in the first direction or after the dial knob has been pressed; and deleting the stored operation data without storing the second symbol if the dial knob has been pressed as the second predetermined period has elapsed after the dial knob has been rotated in the first direction or after the dial knob has been pressed.

6. The method according to claim 4, wherein the first predetermined period and the second predetermined period are equal to each other.

7. The method according to claim 1, further comprising setting a relationship between the operation data and the control data.

8. The method according to claim 1, wherein the first direction is any one of a clockwise direction and a counterclockwise direction, and the second direction is a remaining one of the clockwise direction and the counterclockwise direction.

9. The method according to claim 1, wherein the control data performs one of multimedia functions of the vehicle.

10. The method according to claim 1, wherein the first and second numerical values are predetermined according to the degree of rotation of the dial knob in the first or second direction.

11. A method of controlling a vehicle using a dial knob, the method comprising steps of:

(a2) checking whether the dial knob has been rotated in a first direction;

(b2) generating a first numerical value obtained by numeralizing a degree of rotation of the dial knob, if the dial knob has been rotated in the first direction;

(c2) controlling the vehicle using control data, if a combination of the first numerical value and pre-stored operation data corresponds to the control data;

(d2) checking whether the dial knob has been rotated in a second direction opposite to the first direction, if the combination of the first numerical value and the pre-stored operation data does not correspond to the control data;

(e) storing the operation data reflecting the first numerical value and generating a second numerical value obtained by numeralizing a degree of rotation of the dial knob in the second direction, if the dial knob has been rotated in the second direction; and (f) controlling the vehicle using the control data, if a combination of the second numerical value and the pre-stored operation data corresponds to the control data, wherein, if the combination of the second numerical value and the pre-stored operation data does not correspond to the control data, the method returns to the step (a2) to store the operation data reflecting the second numerical value when the dial knob is rotated in the first direction.

12. The method according to claim 11, further comprising steps of:

checking whether the dial knob has been pressed, if the dial knob has not been rotated in the first direction;

generating a first symbol and storing the operation data reflecting a pre-generated second numerical value and a second symbol, if the dial knob has been pressed;

controlling the vehicle using the control data, if the combination of the first symbol and the pre-stored operation data corresponds to the control data, and returning to the step of checking whether the dial knob has been rotated in the second direction, if the combination of the first symbol and the pre-stored operation data does not correspond to the control data;

checking whether the dial knob has been pressed, if the dial knob has not been rotated in the second direction;

generating a second symbol and storing the operation data reflecting a pre-generated first numerical value or the first symbol, if the dial knob has been pressed; and controlling the vehicle using the control data, if a combination of the second symbol and pre-stored operation data corresponds to the control data, and returning to the step (a2) to store the operation data reflecting the second numerical value or the second symbol when the dial knob is rotated in the first direction, if the combination of the second symbol and the pre-stored operation data does not correspond to the control data.

13. The method according to claim 11, further comprising setting a relationship between the operation data and the control data.

14. The method according to claim 11, wherein the first direction is any one of a clockwise direction and a counterclockwise direction, and the second direction is a remaining one of the clockwise direction and the counterclockwise direction.

15. The method according to claim 11, wherein the control data performs one of multimedia functions of the vehicle.

16. The method according to claim 11, wherein the first and second numerical values are predetermined according to the degree of rotation of the dial knob in the first or second direction.

17. An apparatus for controlling a vehicle, the apparatus comprising:
- a dial knob configured to be rotated in a first or second direction, or pressed, the first and second direction being different from each other;
- a processor configured to generate a first or second numerical value when the dial knob is rotated in the first or second direction and to generate a first or second symbol when the dial knob is pressed;
- a memory configured to store operation data reflecting at least one of the first numerical value, the second numerical value, the first symbol or the second symbol, wherein the processor is further configured to compare the operation data with control data for controlling the vehicle and to check whether the operation data corresponds to the control data; and
- a controller communicatively connected to the dial knob, the processor, and the memory, the controller configured to store at least one of the first numerical value, the second numerical value, the first symbol or the second symbol generated by the processor, to output the control data for controlling the vehicle in response to a result of comparison of the operation data with the control data in the processor, and to read and output the operation data from the memory to the processor.

18. The apparatus according to claim 17, wherein the processor is further configured to check whether a first predetermined period has elapsed after the dial knob has been rotated in the second direction or after the second numerical value or the second symbol has been stored, and to check whether a second predetermined period has elapsed after the dial knob has been rotated in the first direction or after the first numerical value or the first symbol has been stored, and
  wherein the controller resets the memory and stores the operation data reflecting at least one of the first numerical value, the second numerical value, the first symbol or the second symbol in the memory, in response to a result checked by the processor.

19. The apparatus according to claim 17, wherein the controller checks whether operation of the dial knob has been changed and stores at least one of the first numerical value, the second numerical value, the first symbol or the second symbol in the memory in response to a result of checking.

20. The apparatus according to claim 17, wherein the dial knob includes a dual-purpose knob configured to be operated using a first operation method to perform an inherent function thereof and to be operated using a second operation method different from the first operation method to perform a function of the dial knob.

* * * * *